(12) United States Patent
Takahashi

(10) Patent No.: US 7,190,534 B2
(45) Date of Patent: Mar. 13, 2007

(54) IMAGE PICK UP APPARATUS

(75) Inventor: Tomoki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/331,318

(22) Filed: Jan. 12, 2006

(65) Prior Publication Data

US 2006/0158750 A1 Jul. 20, 2006

(30) Foreign Application Priority Data

Jan. 19, 2005 (JP) ............................. 2005-011081

(51) Int. Cl.
  *G02B 7/02* (2006.01)
  *G03B 17/00* (2006.01)
  *G03B 3/00* (2006.01)
(52) U.S. Cl. .................. 359/819; 359/813; 359/814; 359/823; 359/824; 396/55; 396/72; 396/349; 353/101
(58) Field of Classification Search ................ 359/811, 359/819, 813, 814, 823, 824, 827, 828, 385, 359/388, 389, 480, 806, 694–701; 396/55, 396/72, 73, 75, 8, 349, 429, 448, 502, 544, 396/549, 552; 348/335, 341, 345, 360; 353/100, 353/101
See application file for complete search history.

(56) References Cited

U.S. PATENT DOCUMENTS

| | | | | |
|---|---|---|---|---|
| 5,797,047 A | * | 8/1998 | Ando et al. ................. | 396/349 |
| 6,132,110 A | * | 10/2000 | Kume et al. ................ | 396/349 |
| 6,547,402 B2 | * | 4/2003 | Masuda ...................... | 353/101 |

FOREIGN PATENT DOCUMENTS

| | | |
|---|---|---|
| JP | 2000-039657 | 2/2000 |
| JP | 2000-321148 | 8/2000 |
| JP | 3453536 | 7/2003 |

* cited by examiner

*Primary Examiner*—Loha Ben
(74) *Attorney, Agent, or Firm*—Cowan, Liebowitz & Latman, P.C.

(57) ABSTRACT

An object is to provide an image pick up apparatus in which positioning of a lens barrel unit relative to a front cover with respect to the optical axis direction and directions perpendicular to the optical axis can be effected with high accuracy. In an image pick up apparatus including a lens barrel unit 201 having a photographing optical system, a structure 216 that holds the lens barrel unit 201 in such a way that the lens barrel unit 201 is movable in the direction of the optical axis of the photographing optical system and directions perpendicular to the optical axis and a front cover 205 that covers the front side of the image pick up apparatus, the position of the lens barrel unit 201 relative to the front cover with respect to directions perpendicular to the optical axis and with respect to the optical axis direction is determined by the front cover 205 when the front cover 205 is assembled.

11 Claims, 20 Drawing Sheets

<E-E CROSS SECTION>

<CROSS SECTION G-G>

<CROSS SECTION H-H>

<CROSS SECTION I-I>

IMAGE PICK UP APPARATUS

FIELD OF THE INVENTION

The present invention relates to an image pick up apparatus, and in particular to positioning of a lens barrel unit.

BACKGROUND OF THE INVENTION

An image pick up apparatus such as a camera or a video camera generally includes a lens barrel unit in which photographing lens units and an image pickup element are provided to form a unit and an image pick up apparatus body composed of a structure such as a chassis in which the lens barrel unit is mounted. To the image pick up apparatus body and the lens barrel unit, external covers such as a front cover and a rear cover are assembled. Image pick up apparatuses that allow to attach an accessory lens such as a tele conversion lens, a wide conversion lens or a close-up lens to the image pick up apparatus body have been wide-spread. (See Japanese Patent Application Laid-Open No. 2000-231148). This enables to improve photographing effects. When an accessory lens like a tele conversion lens is used, adequate optical performance is realized on condition that the optical axis of the lens barrel unit equipped on the image pick up apparatus body and the optical axis of the lens(es) provided in the accessory lens are aligned.

The lens barrel unit is typically positioned on a structure (i.e. chassis) provided in the image pick up apparatus body and fixed thereto with screws. A detachable mechanism of an accessory lens is provided on a front cover that covers the front side of the image pick up apparatus body, and the front cover is positioned on the chassis and secured thereto. This means that the optical axis of the lens barrel unit and the center axis of the detachable mechanism of an accessory lens are mediated by the chassis on which these parts are positioned. In this structure, dimensional errors are likely to occur. In recent years, the magnifying power of the photographing lens of image pick up apparatuses has been increasing, and the alignment of the optical axis has become even more important in ensuring optical performance. There is an image pick up apparatus that has an adjusting mechanism for aligning the optical axis of the lens barrel unit and the optical axis of the lens(es) equipped in the accessory lens (see Japanese Patent No. 3453536 (FIGS. 1 to 3)).

Image pick up apparatuses that are not provided with a detachable mechanism of an accessory lens also have a problem concerning its external appearance, that is, the problem that there are variations or non-uniformity in the gap around the lens barrel unit inside the aperture formed on the front cover that covers the image pick up apparatus body for exposing the lens barrel unit to the exterior of the image pick up apparatus.

A conventional image pick up apparatus in which the lens barrel unit is positioned relative to the front cover with respect to directions perpendicular to the optical axis has the structure shown in FIG. 25. In this structure, the lens barrel unit 102 is secured to the chassis 103 with intermediate rubber bushings 106a, 106b and 106c so that the lens barrel unit 102 is movable in its optical axis direction and directions perpendicular to the optical axis. In the following, the way of holding or supporting a lens barrel unit on a structure (or chassis) in which the lens barrel unit is movable in the optical axis direction and directions perpendicular to the optical axis will be expressed as "floating support". The rubber bushings 106a, 106b and 106c are fitted into holes 103a, 103b and 103c, and screws 105a, 105b and 105c are secured to the lens barrel unit 102 together with the rubber bushings 106a, 106b and 106c and the chassis 103. The front cover 100 is positioned relative to the chassis 103 at the bottom side (A) and a lateral side (B). A front cover ring 101 is attached on the central portion of the front cover 100. Thus, before the front cover 100 is assembled, the lens barrel unit 102 is held on the chassis 103 in such a way as to be movable relative to the chassis 103 within the elastic range of the rubber bushings 106a to 106c. Therefore, it is not until the lens barrel unit 102 is assembled to the front cover 100 that the lens barrel unit 102 is directly positioned relative to the front cover ring 101. The reference numeral 104 designates a rear cover.

FIG. 26 shows the apparatus as seen from the front. FIG. 27 shows the apparatus as seen from the back in a state the rear cover 104 has been removed. FIG. 28 is a cross sectional view taken along line A—A in FIG. 27.

In FIG. 28, it can be understood that the lens barrel unit 102 can move in the optical axis direction and directions perpendicular to the optical axis by means of elasticity of the rubber bushings 106a, 106b and 106c. The front end outer circumference portion 102a of the lens barrel unit 102 is set inside the inner circumference portion 101a of the front cover ring 101. Thus, the center axis of the aperture 101b of the front cover ring 101 and the center axis of the lens barrel unit 102 will be aligned and the clearance around the end portion 102b of the outer circumference of the lens movable portion of the lens barrel unit 102 inside the aperture 101b will be kept uniform. Therefore, even if dimensional accuracy of the chassis 103, the front cover 100 and the lens barrel unit 102 is not so high, the externally appearing the clearance around the end portion 102b of the outer circumference of the lens movable portion inside the aperture 101b can be kept uniform, since the rubber bushings 106a to 106c elastically deform.

In order to solve the above-mentioned problem concerning alignment of the optical axes of the lens barrel unit and the accessory lens and the aesthetic problem concerning non-uniformity of the clearance between the lens barrel unit and the front cover have caused a decrease in yields in mass production of parts, which leads to an increase in the unit price of the parts. This is because it has been needed to increase dimensional accuracy of each part so as to reduce errors of each of parts that constitute the image pick up apparatus and assembling errors in manufacturing process as much as possible. Use of an adjusting mechanism leads to an increase in the apparatus size or an increase in the cost. In addition, it is troublesome to operate the adjusting mechanism after attaching an accessory lens.

Since the conventional floating holding structure shown in FIGS. 25 to 28 uses elastic bodies in the form of rubber bushings, repulsive force of the elastic bodies is continuously acting on the lens barrel unit. This sometimes causes deformation of the lens barrel unit due to secular changes.

FIG. 29 shows a state in which the lens barrel unit 102 is mounted in a manner inclined in the rotation direction indicated by an arrow. The externally appearing clearance around the end portion 102b of the outer circumference of the lens movable portion of the lens barrel unit 102 inside the aperture 101b of the front cover ring 101 is kept uniform. However, the rubber bushing 106c is elastically deformed to exert a repulsive force on the lens barrel unit 102. In other words, a moment is continuously acting on the lens barrel unit 102. Consequently, the optical axis 107 of the lens barrel unit 102 deviates from the center axis 108 of the front cover ring 101.

Since a photographing lens unit and a lens extending mechanism for enabling zooming are provided in the lens barrel unit, deformation of the lens barrel unit due to secular changes may cause deterioration in optical performance and operation errors of the lens extending mechanism.

In order to regulate the lens barrel unit with respect to the optical axis direction and directions perpendicular to the optical axis relative to the front cover, the lens barrel unit may be assembled to the front cover. However, if the lens barrel unit is assembled in the front cover that constitutes an external cover, the following risk arises. That is, there is a risk that the external cover may be scratched when a structure such as a chassis and an electronic circuit board is assembled in it.

SUMMARY OF THE INVENTION

The present invention has been made in consideration of the above situation, and has as its object to provide an image pick up apparatus in which positioning of the lens barrel unit relative to the front cover with respect to the optical axis direction and a direction(s) perpendicular to the optical axis with high accuracy.

According to the present invention, the foregoing object is attained by providing an image pick up apparatus comprising:

a lens barrel unit including a photographing optical system;

a holding unit that holds the lens barrel unit in such a way that the lens barrel unit is movable in the direction of the optical axis of said photographing optical system and a direction perpendicular to the optical axis; and a front cover that covers the front side of the image pick up apparatus;

wherein the position of said lens barrel unit relative to said front cover with respect to the direction perpendicular to the optical axis and with respect to the optical axis direction is determined by said front cover.

According to the present invention, the foregoing object is also attained by providing an image pick up apparatus comprising:

a lens barrel unit including a photographing optical system;

a holding unit that holds the lens barrel unit in such a way that the lens barrel unit is movable in the direction of the optical axis of said photographing optical system and a direction perpendicular to the optical axis; and a front cover that covers the front side of the image pick up apparatus;

wherein a part of said lens barrel unit and a part of said front cover engage each other.

Other features and advantages of the present invention will be apparent from the following description taken in conjunction with the accompanying drawings, in which like reference characters designates the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

The best mode for carrying out the present invention will be described in the following as first to fourth embodiments.

(First Embodiment)

In the following, an image pick up apparatus as the first embodiment of the present invention will be described in detail, taking an electronic image pick up apparatus as an example, with reference to accompanying drawings.

Figure 1:
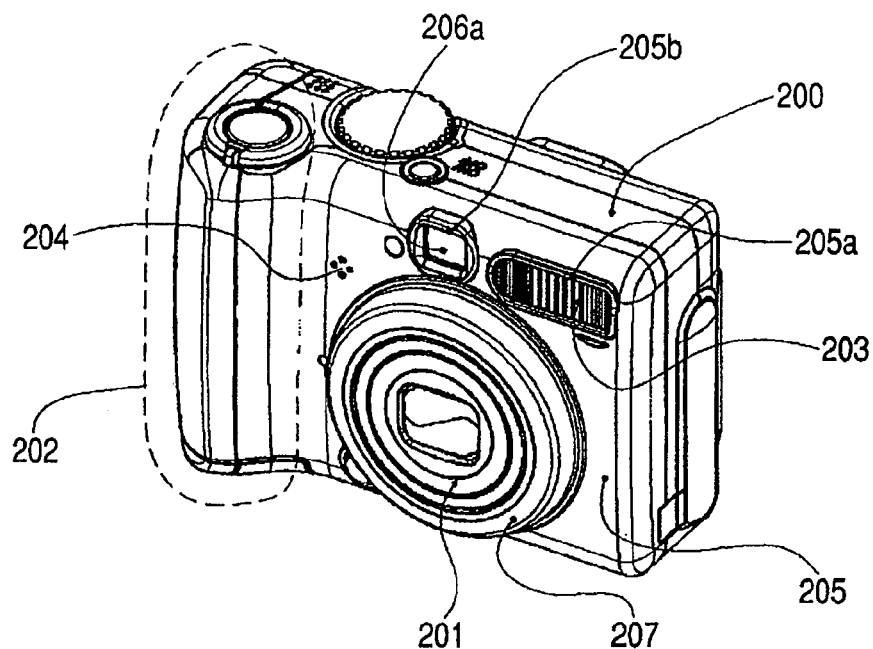
FIG. 1 is a schematic front perspective view of a first embodiment of the present invention.
Figure 2:
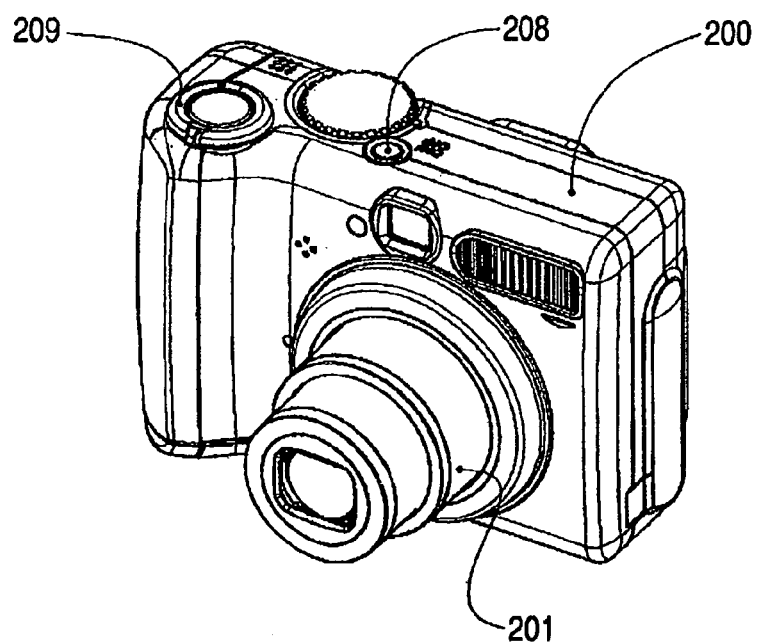
FIG. 2 is a schematic front perspective view of the first embodiment, showing a state in which power has been turned on and a lens barrel unit has been extended.
Figure 3:
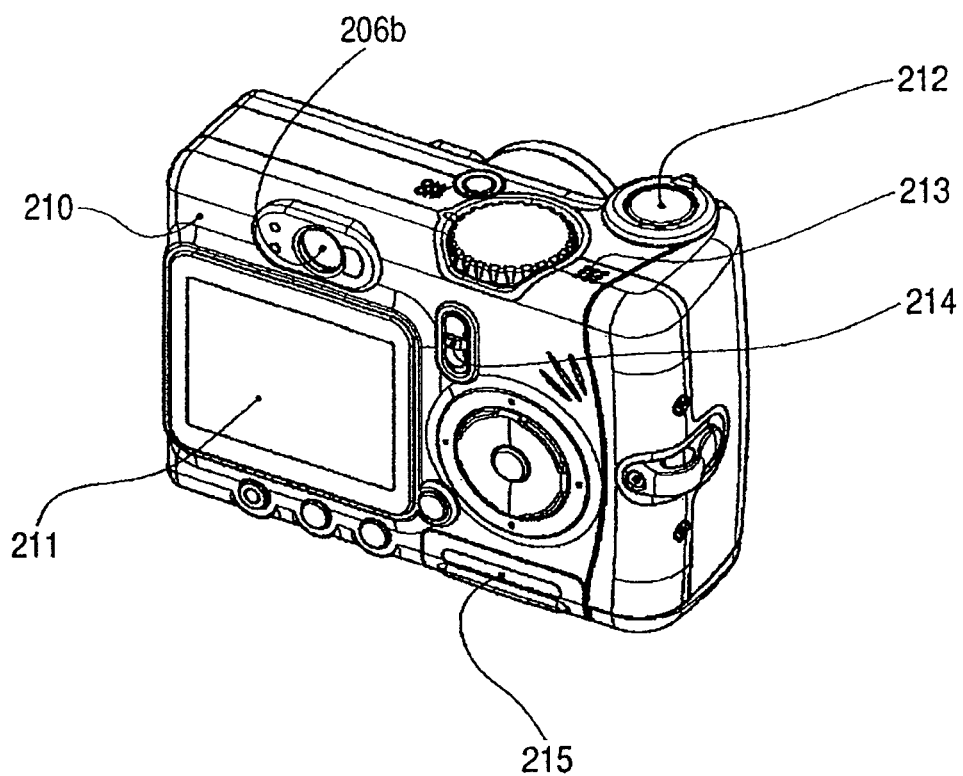
FIG. 3 is a schematic rear perspective view of the first embodiment.

FIGS. 1 to 3 schematically show an electronic image pick up apparatus according to the first embodiment. FIG. 1 is a schematic front perspective view of the first embodiment. FIG. 2 is a schematic front perspective view showing the first embodiment in the state in which power has been turned on and the lens barrel unit has been extended. FIG. 3 is a schematic rear perspective view thereof.

In FIG. 1, reference numeral 200 designates an image pick up apparatus body. On the front side of the image pick up apparatus body, a lens barrel unit 201 equipped with a photographing optical system lens, a lens barrier, an image pickup element such as a CCD, a lens extending mechanism, a zooming mechanism and a shutter etc. is partly exposed. The optical system provided in the lens barrel unit 201 forms an object image on the image pickup element. Reference numeral 202 designates a grip portion for allowing holding of the image pick up apparatus body 200 with the user's right hand.

At the right above the lens barrel unit 201, there is provided a flash emission window 203 through which light is emitted when needed, for example when light quantity available is insufficient upon photographing. At the left above the lens barrel unit 201, there is provided a microphone 204 for picking up sounds.

Reference numeral 205 designates a front cover for covering the front side portion of the image pick up apparatus body 200. On the front cover 205, a portion 205a that defines an aperture for exposing the above-mentioned flash emission window 203 and a portion 205b that defines an aperture for exposing an objective lens 206a of a viewfinder unit are integrally formed. Reference numeral 207 designates a bayonet ring, which conceals an accessory lens mount that is integrally formed on the front cover 205 when no accessory lenses that will be described later are used.

In FIG. 2, reference numeral 208 designates a power button. When power is turned on, if in the photographing mode the lens barrel unit 201 is extended out to a predetermined position as shown in FIG. 2. Reference numeral 209 designates a zoom dial. The zoom dial 209 is constructed in such a way that it can be turned clockwise and anticlockwise up to predetermined positions. By turning the zoom dial 209 as an entry interface for the image pick up apparatus body 200, the positional relationship of the photographing optical system lenses provided in the lens barrel unit 201 can be changed to achieve zooming between wide-angle and telephoto.

As shown in FIG. 3, a rear cover 210 covers the rear side of the image pick up apparatus body 200. On the center left of the rear cover 210, there is provided a liquid crystal display device 211, which is used for observing an object image to be picked up and displaying a picked up image. Reference numeral 212 designates a shutter button. Upon operation of the shutter button 212, an image of an object is picked up and image data of the object image is recorded in a recording medium equipped in the image pick up apparatus body 200. At that time, sound data picked up by the above-mentioned microphone 204 may be recorded together with the image data. A speaker 213 for reproducing sound is provided in the interior of the apparatus so that sound stored in the recording medium or operation sound recorded in the recording medium in advance can be reproduced.

On the bottom face of the image pick up apparatus body 200, there is provided a battery compartment door (not shown) that can be opened/closed relative to the image pick up apparatus body 200. A main battery (not shown) serving as power source is removably inserted into the image pick up apparatus body 200. An eyepiece lens 206b of the viewfinder unit is provided above the liquid crystal display device 211. Reference numeral 214 designates a mode lever that allows the user to switch between the photographing mode and the reproduction mode. Reference numeral 215 designates a memory card cover. The memory card cover 215 can be opened/closed relative to the image pick up apparatus body 200. When the memory card cover 215 is in an opened state, a recording medium (or a memory card) can be inserted/removed.

Next, a mechanism for mounting the lens barrel unit to the main structure of the first embodiment will be described in detail with reference to FIGS. 4 to 11.

Figure 4:
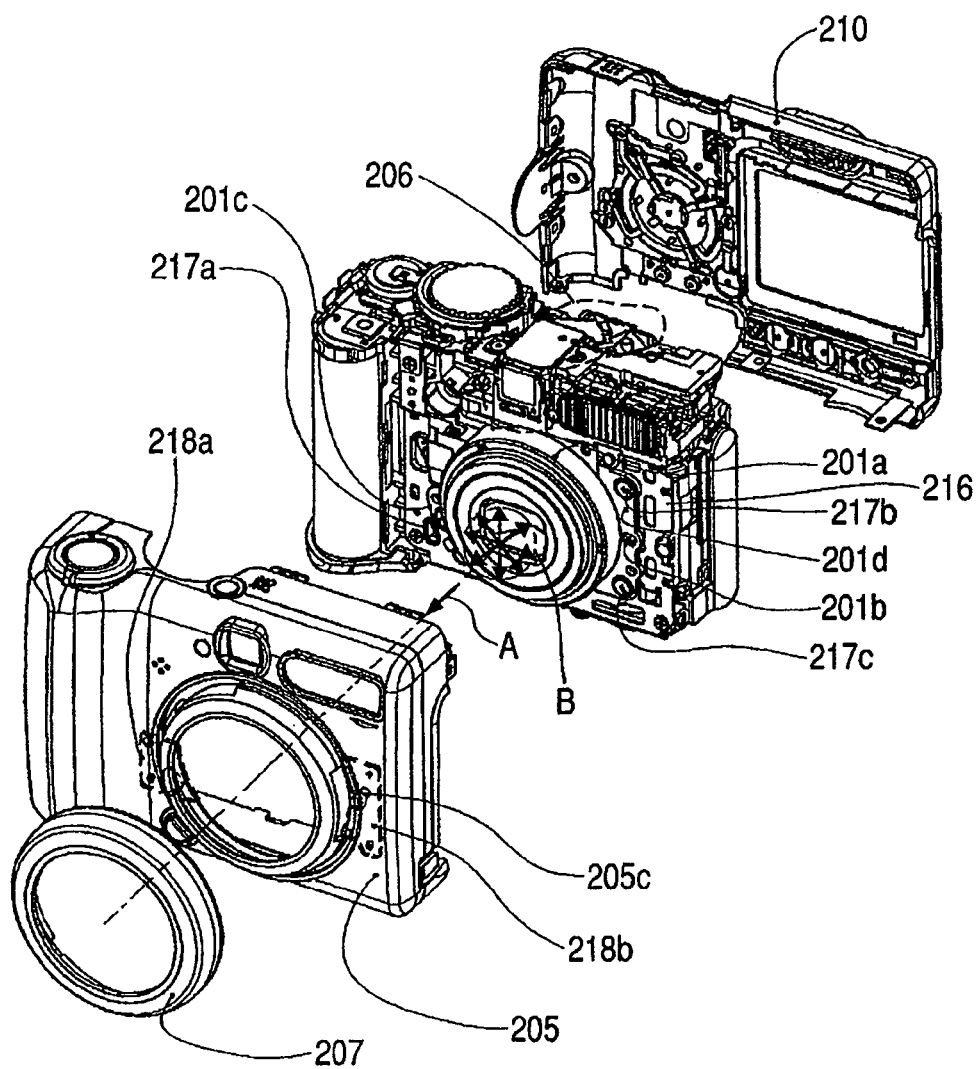
FIG. 4 is a perspective view showing a state in which a front cover and a rear cover have been detached in the first embodiment.

FIG. 4 is a perspective view showing a state in which the front cover and the rear cover have been detached. In FIG. 4, arrow A indicates the optical axis direction and arrows B indicate directions perpendicular to the optical axis.

Figure 5:
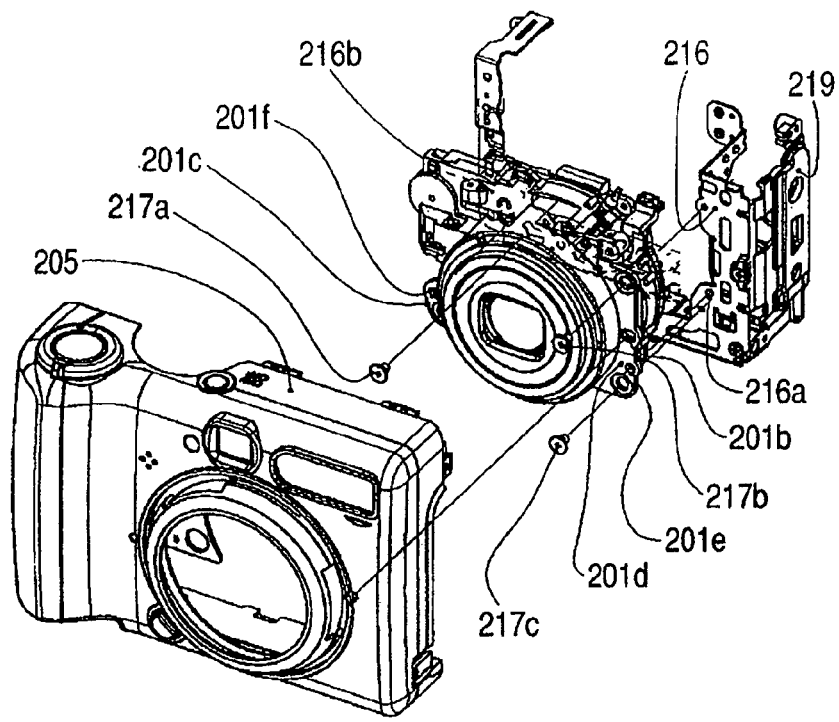
FIG. 5 is an exploded perspective view showing the front cover, the lens barrel unit, a chassis and shoulder screws in the first embodiment.

FIG. 5 is a perspective view that shows the front cover, the lens barrel unit, the chassis and shoulder screws in an exploded way.

Figure 6:
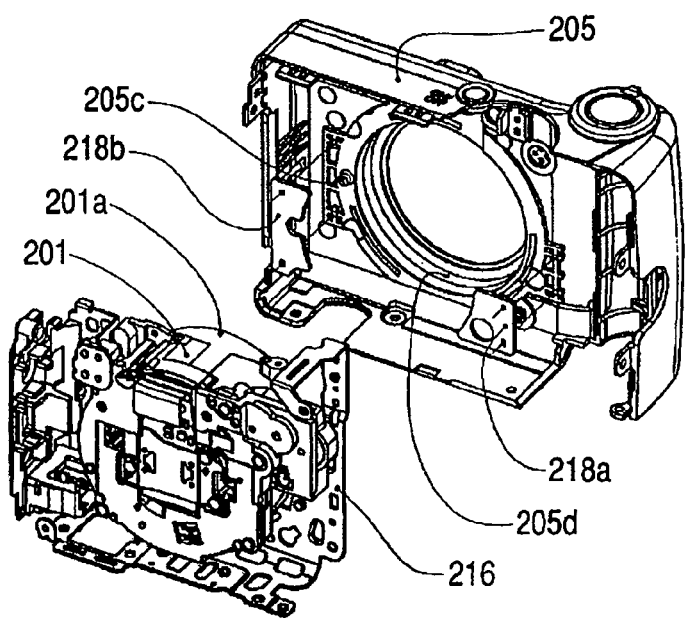
FIG. 6 is a perspective view of the first embodiment in a state in which the front cover and the lens barrel unit are provisionally secured to the chassis.

FIG. 6 is a perspective view showing a state in which the front cover and the lens barrel unit are provisionally secured to the chassis.

Figure 7:
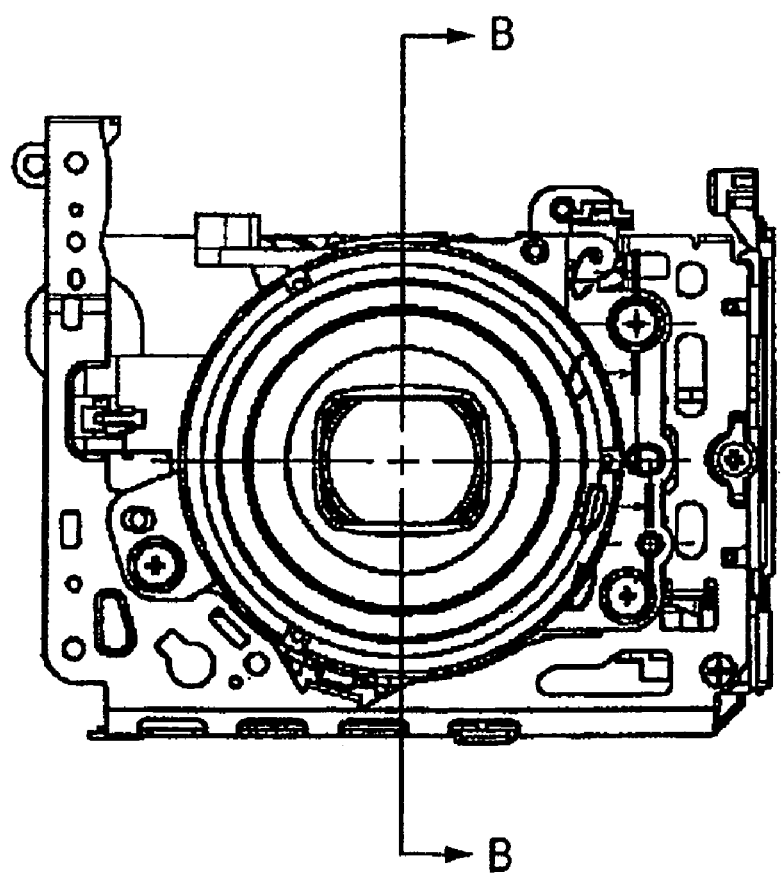
FIG. 7 is a front view of the first embodiment in a state in which the lens barrel unit is provisionally attached to the chassis.
Figure 8:
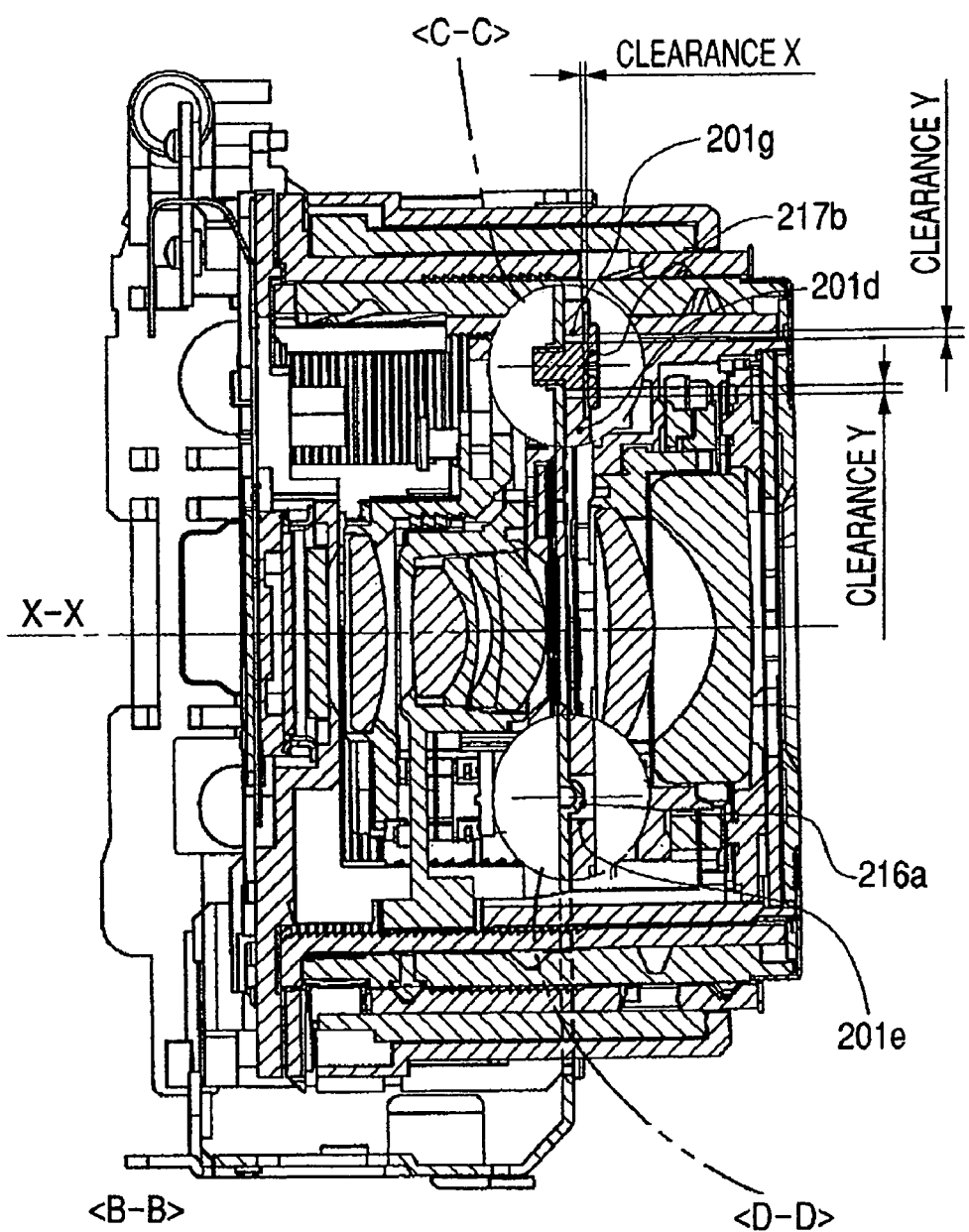
FIG. 8 is an enlarged cross sectional view taken along line B—B in FIG. 7, in which an enlarged cross sectional views taken along line C—C and line D—D are inset.

FIG. 7 is a front view showing a state in which the lens barrel unit is provisionally attached to the chassis. FIG. 8 is an enlarged cross sectional view taken along line B—B in FIG. 7 in which an enlarged cross sectional views taken along line C—C and line D—D are inset.

Figure 9:
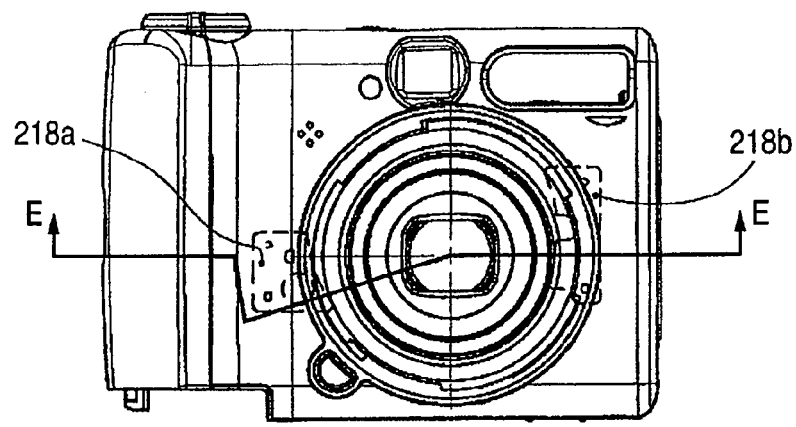
FIG. 9 is a front view of the first embodiment upon positioning the lens barrel unit, which has been provisionally attached to the chassis, relative to the front cover.
Figure 10:
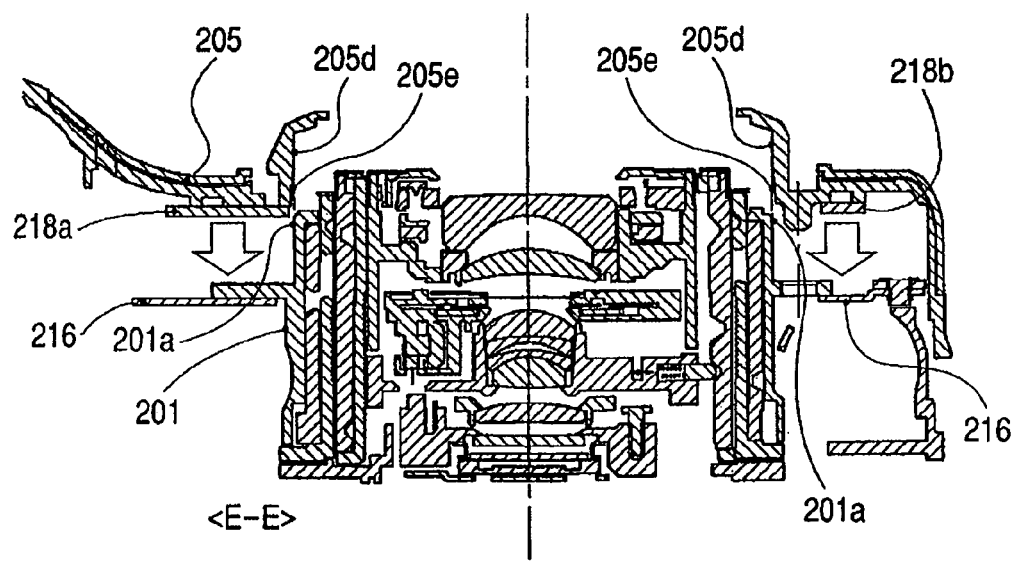
FIG. 10 is a cross sectional view of the first embodiment taken along line E—E in FIG. 9, showing a state just before assembling the front cover.
Figure 11:
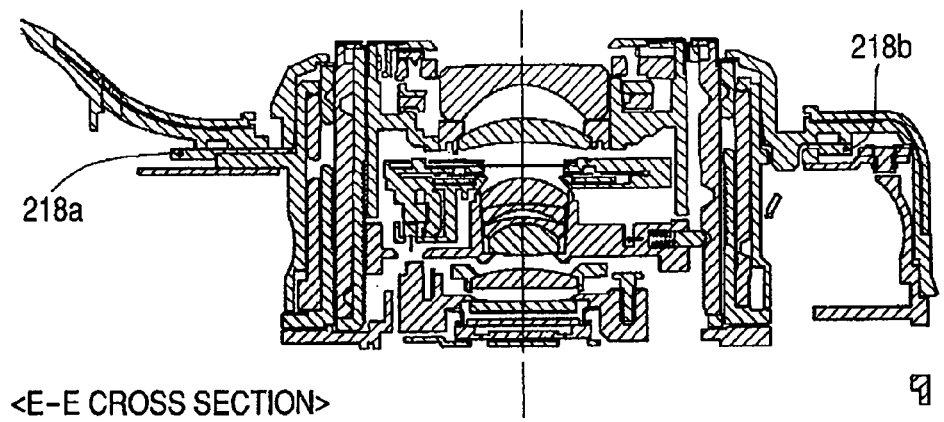
FIG. 11 is a cross sectional view of the first embodiment taken along line E—E in FIG. 9, showing a state after the front cover has been assembled.

FIG. 9 is a front view upon positioning the lens barrel unit, which has been provisionally attached to the chassis, relative to the front cover. FIG. 10 is a cross sectional view taken along line E—E in FIG. 9 showing a state just before assembling the front cover. FIG. 11 is a cross sectional view taken along line E—E in FIG. 9 showing a state after the front cover has been assembled.

In FIG. 4, the chassis 216 that constitutes the main structure is provided inside the front cover 205 and the rear cover 210, and the lens barrel unit 201 is provisionally attached on the chassis 216 with three shoulder screws 217a, 217b and 217c. By this provisional attachment, the lens barrel unit 201 is supported in a floating manner so as to be movable relative to the chassis 216 in the optical axis direction and directions perpendicular to the optical axis. In this first embodiment, it is held by the three shoulder screws, but the number of the screws may be changed. When the front cover 205 is assembled, the front end circumference portion 201a of the lens barrel unit 201 is guided by a positioning guide portion 205e (which will be described later) of the front cover 205. The front end circumference portion 201a is guided by the guide portion 205e to engage a positioning portion 205d. In connection with positional relationship between the front cover 205 and the lens barrel unit 201, the front end circumference portion 201a functions as a positioning engagement portion with respect to directions perpendicular to the optical axis. An oval long hole 201b is formed on a part of the lens barrel unit 201. The oval long hole 201b engages an anti-rotation engagement shaft 205c projecting from the front cover 205 to regulate the positional relationship between the front cover 205 and the lens barrel unit 201 with respect to rotation on a plane perpendicular to the optical axis.

The lens barrel unit 201 has flange portions 201c and 201d, on right and left sides, extending in a direction within a plane perpendicular to the optical axis. One surface of each of the right and left flange portions 201c and 201d is in contact with the chassis 216. The other surface of each flange portion is in contact with an elastic body 218a, 218b which is disposed on the front cover in the vicinity of the lens barrel unit 201. By this contact with the elastic bodies 218a and 218b, the lens barrel unit 201 is biased toward the chassis 216, so that the positional relationship between the lens barrel unit 201 and the chassis 216 regulates the movement of the lens barrel unit in the optical axis direction.

FIG. 5 is a perspective view showing the front cover 205, the lens barrel unit 201, the three shoulder screws 217a, 217b and 217c, the chassis 216 and a side cover 219 attached to the chassis 216 in an exploded state. The lens barrel unit 201 is placed on the chassis 216, and engagement holes for provisional positioning 201e and 201f provided on the lens barrel unit 201 respectively engage shaft portions for provisional positioning 216a and 216b provided on the chassis 216. The engagement holes for provisional positioning 201e and 201f are sufficiently larger than the diameter of the shaft portions for provisional positioning 216a and 216b. Thus, it is possible to displace the lens barrel unit 201 relative to the chassis 216 in the plane perpendicular to the optical axis within a certain range. The engagement holes for provisional positioning 201e and 201f may be used as positioning holes upon assembling the lens barrel unit 201, though a detailed description thereof will be omitted. The shoulder screws 217a, 217b and 217c regulate the lens barrel unit 201 with respect to the optical axis direction. The lens barrel unit 201 is not fixed on the chassis 216 completely. The screws are tightened with a certain clearance being left, so that the lens barrel unit 201 can move relative to the chassis 216 with respect to the optical axis direction within a certain range. After the shoulder screws 217a to 217c are tightened, the chassis 216 is supported on the lens barrel unit 201 in a floating manner.

In FIG. 6, the lens barrel unit 201 is supported on the chassis 216 in a floating manner. The elastic bodies 218a and 218b are fixedly adhered to the front cover 205. In this first embodiment, a sheet-like foam member is used as the elastic body. A rubber or gel member, a leaf spring or a coil spring may also be used instead. On the front cover 205, there is provided the positioning portion 205d that regulates the lens barrel unit 201 with respect to directions perpendicular to the optical axis and the anti-rotation engagement shaft 205c for regulating rotation of the lens barrel unit 201 in the plane perpendicular to the optical axis. The positioning portion 205d and the anti-rotation engagement shaft 205c engage the front end circumference portion 201a of the lens barrel unit 201 and the long hole 201b (shown in FIG. 5) respectively. By these engagements, the lens barrel unit 201 is positioned relative to the front cover 205 with respect to directions perpendicular to the optical axis.

When the front cover 205 is assembled, movement of the lens barrel unit 201 relative to the chassis 216 is regulated with respect to the optical axis direction. This is because the elastic bodies 218a and 218b attached on the front cover 205 elastically bias the flange portions 201c and 201d of the lens barrel unit 201 to press them against the chassis 216.

FIGS. 7 and 8 show a state in which the lens barrel unit 201 is supported on the chassis 216 in a floating manner. In FIG. 8, reference character X indicates a clearance in the optical axis direction, and reference character Y indicates a clearance in a direction perpendicular to the optical axis. Line X—X corresponds to the optical axis. In the cross sectional view taken along line C—C, the shoulder screw 217b is screwed on the chassis 216 with a certain clearance being left therebetween. Thus, the shoulder screw 217b is movable in the optical axis direction and directions perpendicular to the optical axis relative to the hole portion 201g that is formed on a part of the flange portion 201d of the lens barrel unit 201 in such a way as to be kept out of the shoulder screw 217b. The cross sectional view taken along line D—D shows the shaft portion for provisional positioning 216a and the engagement hole 201e used for provisionally positioning the lens barrel unit 201 when it is placed on the chassis 216.

FIG. 9 is a front view upon positioning the lens barrel unit, which has been provisionally attached to the chassis, relative to the front cover. FIG. 10 shows a state just before assembling the front cover, where FIG. 10 corresponds to a cross sectional view taken along line E—E in FIG. 9. FIG. 11 shows a state after the front cover has been assembled, where FIG. 11 corresponds to also a cross sectional view taken along line E—E in FIG. 9.

In FIG. 10, the lens barrel unit 201 supported on the chassis 216 in a floating manner is positioned relative to the front cover 205 while the front end circumference portion 201a is guided by a positioning guide portion 205e (a slanted surface) of the front cover 205. The lens barrel unit 201 is finally positioned by the positioning portion 205d, which is a cylindrical surface coaxial with the optical axis. After that, the elastic bodies 218a and 218b elastically bias the lens barrel unit 201 in the direction pressing it against the chassis 216 as shown in FIG. 11. The lens barrel unit 201 is mounted on the image pick up apparatus body while being positioned relative to the front cover 205 and without receiving unnecessary moments applied from directions other than the optical axis direction. This is because the lens barrel unit 201 is biased by the elastic bodies 218a and 218b after its positioning on the front cover 205 has been finished.

Next, relationship of the lens barrel unit, the bayonet ring and accessory lenses and their structures will be described with reference to FIGS. 12 to 17.

Figure 12:
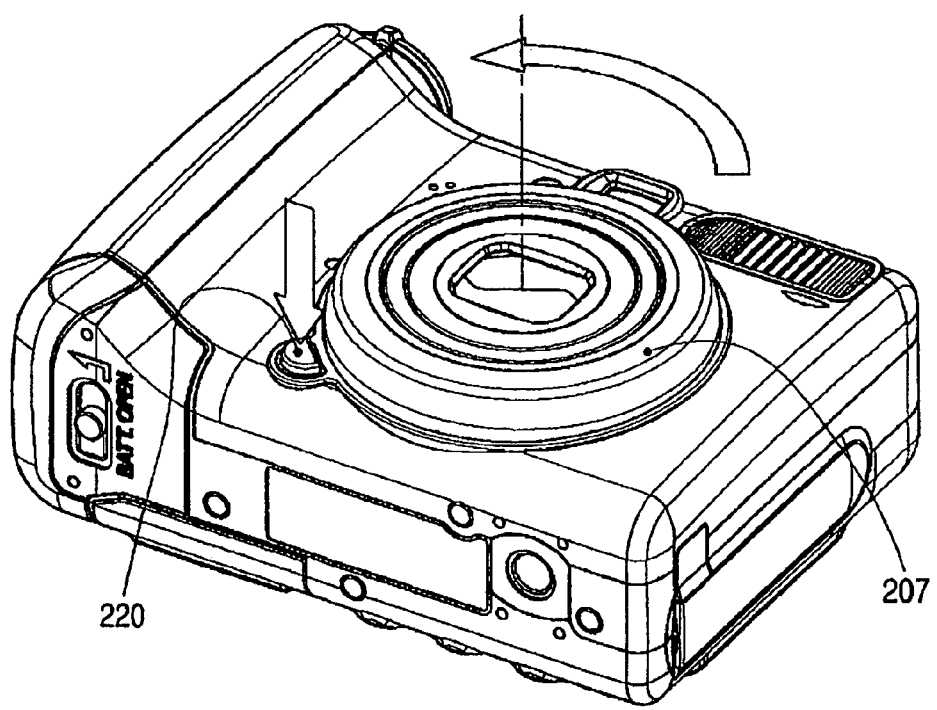
FIG. 12 is a perspective view of the first embodiment as seen from an angle different from FIG. 1.
Figure 13:
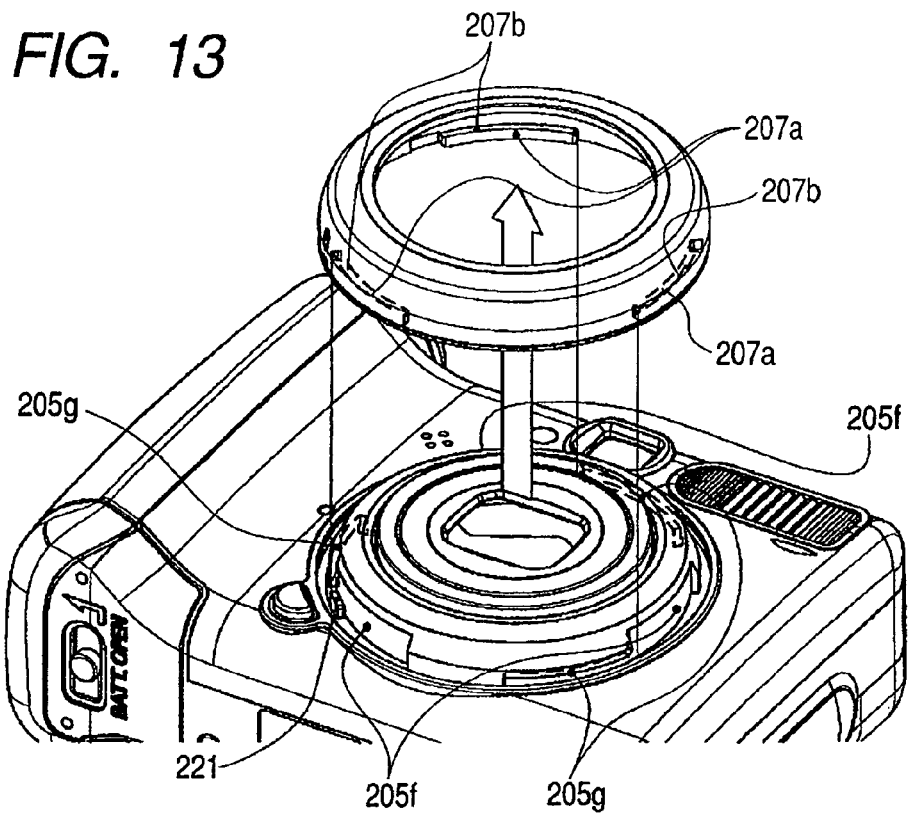
FIG. 13 is a perspective view of the first embodiment in a state in which the bayonet ring has been detached.
Figure 14:
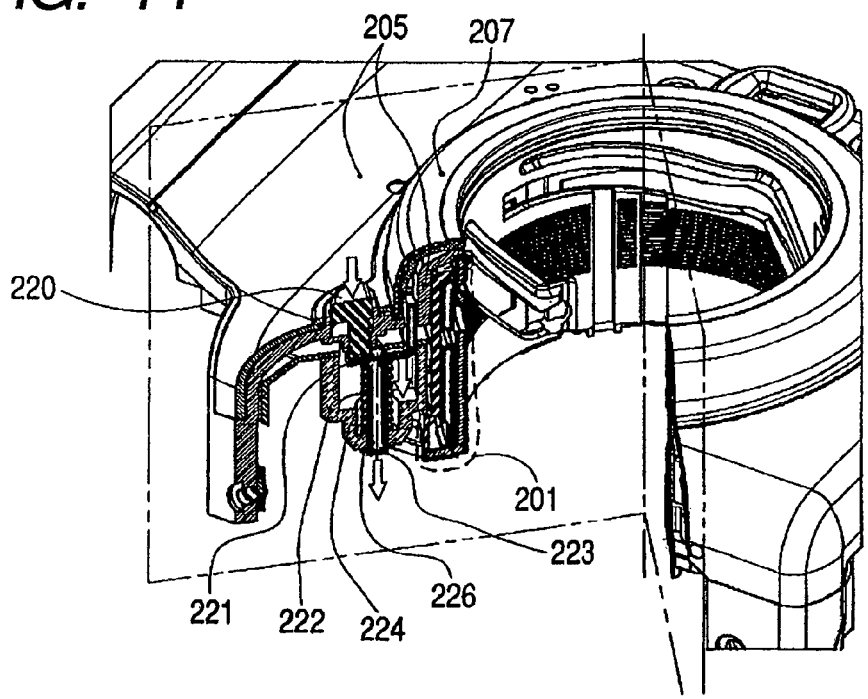
FIG. 14 is a perspective view, partially in cross section, of a lock mechanism of the bayonet ring in the first embodiment.
Figure 15:
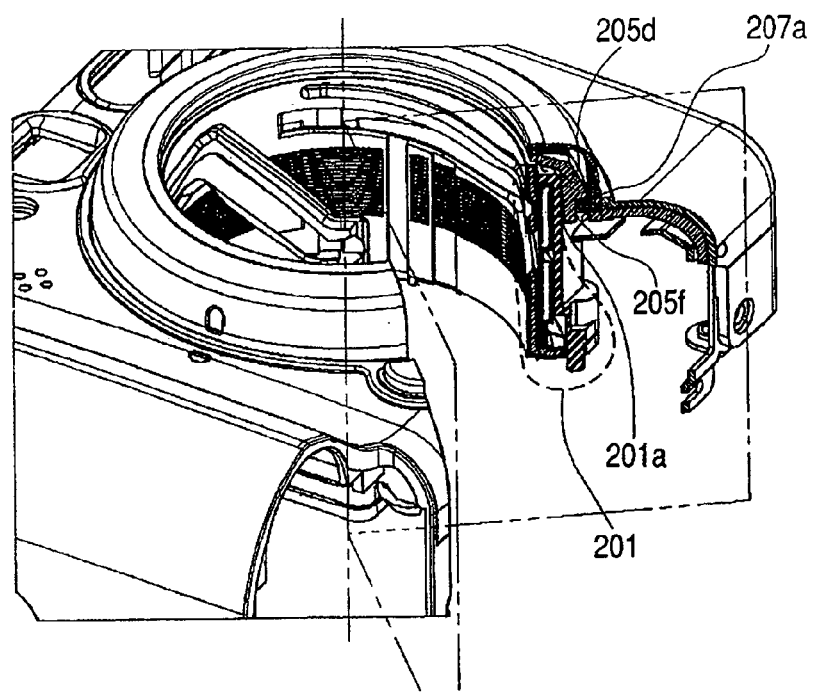
FIG. 15 is a perspective view, partially in cross section, showing the relationship between the bayonet ring and the lens barrel unit in the first embodiment.
Figure 16:
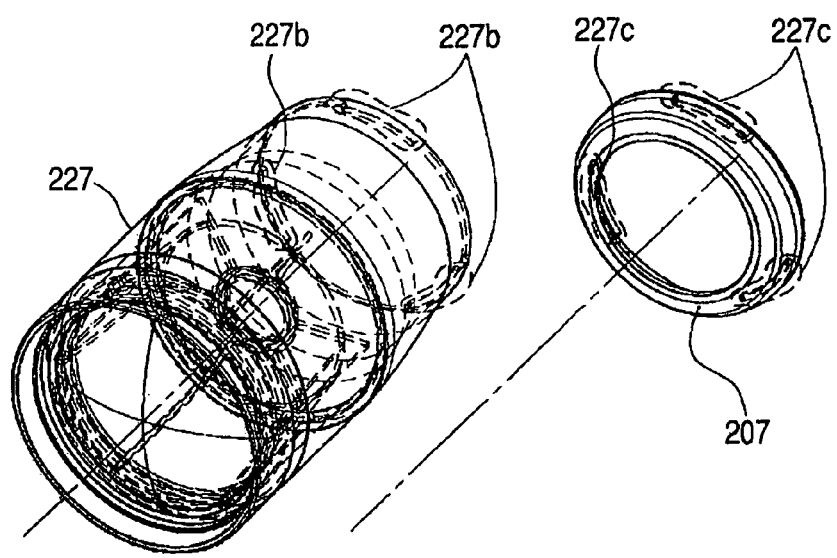
FIG. 16 is a perspective view of the bayonet ring and an accessory lens.
Figure 17:
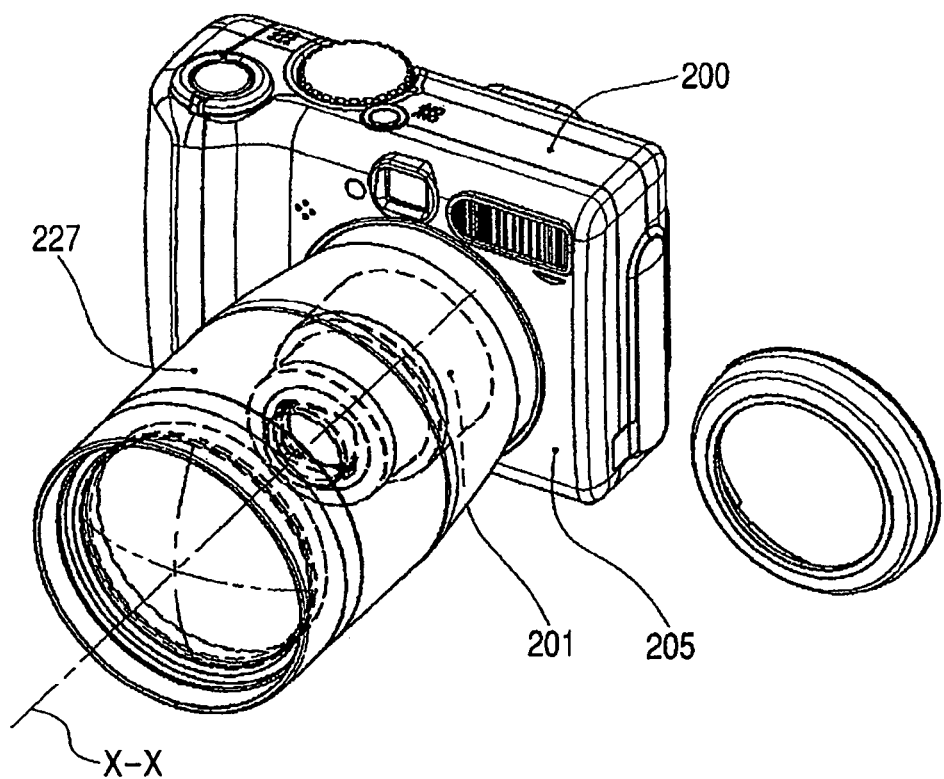
FIG. 17 is a perspective view of the first embodiment showing a state in which an accessory lens is attached.

FIG. 12 is a perspective view of the image pick up apparatus body. FIG. 13 is a perspective view of the image pick up apparatus body in the state in which the bayonet ring has been detached. FIG. 14 shows a perspective cross-section of a lock mechanism of the bayonet ring. FIG. 15 is a perspective cross-section showing the relationship between the bayonet ring and the lens barrel unit. FIG. 16 is a perspective view of the bayonet ring and an accessory lens. FIG. 17 is a perspective view showing a state in which an accessory lens is attached.

A description will be made with reference to FIG. 12. When a bayonet ring lock release button 220 is depressed in the direction indicated by an arrow, the lock is released. If the bayonet ring 207 is turned anticlockwise by 45 degrees with respect to the optical axis in the state in which the lock has been released, engaging portions provided respectively in the front cover 205 and the bayonet ring 207 disengage. Thus, the bayonet ring 207 can be detached along the optical axis direction.

FIG. 13 shows a state in which the bayonet ring 207 has been detached from the image pick up apparatus body. The bayonet ring 207 has three positioning ribs 207a that projects inwardly on its inner circumference. The positioning ribs 207a function to position the bayonet ring 207 relative to the front cover 205 with respect to directions perpendicular to the optical axis. Reference numeral 207b designates retaining engagement members for preventing detachment with respect to the optical axis direction. An outwardly projecting, substantially cylindrical protrusion outer wall 205f functions as positioning shaft for regulating the bayonet ring 207 relative to the front cover 205 with respect to directions perpendicular to the optical axis. Retaining engagement portions 205g projecting from the protrusion outer wall 205f is to engage the retaining engagement portions 207b to prevent detachment of the bayonet ring 207 with respect to the optical axis direction. Reference numeral 221 designates a bayonet lock plate, which is interlocked with the above-mentioned bayonet ring lock release button 220 and functions to lock the bayonet ring 207 thereby preventing the bayonet ring 207 from unexpectedly turning.

Referring to FIG. 14, the bayonet lock plate 221 is swaged on a plate shaft 223. The bayonet lock plate 221 is assembled by an e-ring 226 through a bayonet lock plate holder 222 so that the bayonet lock plate 221 is movable in the direction indicated by an arrow in FIG. 14 while opposing the force of a spring 224 disposed around the plate shaft 223. The spring 224 biases the bayonet lock plate 221 upwardly in FIG. 14. The bayonet lock plate holder 222 is fixed on the chassis 216 by screws (not shown). The bayonet ring lock release button 220 is assembled through the front cover 205 by means of an e-ring (not shown) in such a way that it is movable in the direction indicated by an arrow in FIG. 14. An end of the bayonet ring lock release button 220 is disposed to abut the bayonet lock plate 221 so that it operates together with the bayonet lock plate 221.

Referring to FIG. 15, the front end circumference portion 201a that functions as the positioning engagement portion of the lens barrel unit 201 is in engagement with the positioning portion 205d of the front cover 205. A certain cross section is shown in FIG. 15. The front end circumference portion 201a and the positioning portion 205d are in engagement with each other all along the circumference around the optical axis at the center. The positioning rib 207a of the bayonet ring 207 is in engagement with the protrusion outer wall 205f of the front cover 205. FIG. 15 shows them only in a certain cross section. The three positioning ribs 207a to 207c (which have been described with reference to FIG. 13) projecting inwardly from the bayonet ring 207 are also positioned on the protrusion outer wall 205f. The lens barrel unit 201 is positioned on the positioning portion 205d of the front cover 205, and the bayonet ring 207 is positioned on the protrusion outer wall 205f of the front cover 205. Therefore, the coaxiality of the bayonet ring 207 and the optical axis of the lens barrel unit 201 is determined only by the positioning portion 205d of the front cover 205 and the protrusion outer wall 205f. In other words, the coaxiality of the bayonet ring 207 and the optical axis of the lens barrel unit 201 is not affected by dimensional accuracy of the other parts.

In addition, externally appearing gap between the bayonet ring 207 and the lens barrel unit 201 shown in FIG. 1 is influenced only by three parts, namely the lens barrel unit 201, the front cover 205 and the bayonet ring 207. Therefore, it is possible to make this externally appearing gap uniform only by enhancing the dimensional accuracy of these three parts without efforts of improving the dimensional accuracy of the other structures such as the chassis 216.

What is shown in the right of FIG. 16 is the bayonet ring 207, and shown in the left is an accessory lens 227. In typical cases, an intermediate member such as a lens adapter may be used intermediately when an accessory lens is attached to an apparatus. However, in the following description, the whole attachment including auxiliary members such as a lens adapter, if any, will be referred to as an accessory lens 227.

The bayonet ring 207 and the accessory lens 227 respectively have three ribs 227c and 227b having the same shape. Therefore, the bayonet ring 207 and the accessory lens 227 are exactly the same in their structure for attachment to the image pick up apparatus body and in positioning accuracy.

Line X—X in FIG. 17 corresponds to the optical axis center. The coaxiality of the optical axis of the accessory lens 227 and the optical axis of the lens barrel unit 201 in the attached state is determined only by the front cover 205. Accordingly, the accuracy is enhanced and the performance of the accessory lens 227 can be fully realized. As the accessory lens, a tele conversion lens, wide conversion lens, a close-up lens, and various filters may be prepared.

The description of the first embodiment has been directed to an accessory lens attaching mechanism having a locking structure. However, the attaching mechanism may be a screwing mechanism in which screws are threaded on the protrusion outer wall 205f of the front cover 205 and the positioning ribs 207a of the bayonet ring 207 respectively.

Figure 18A:
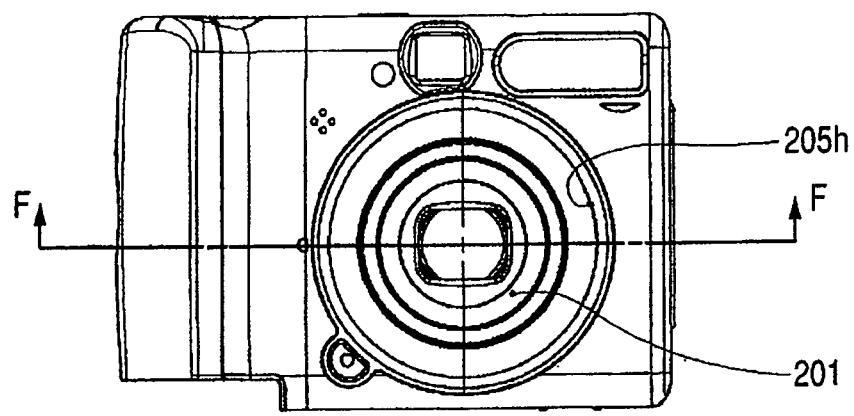
FIGS. 18A and 18B show a screwed-type accessory lens attaching mechanism as a modification of the first embodiment.
Figure 18B:
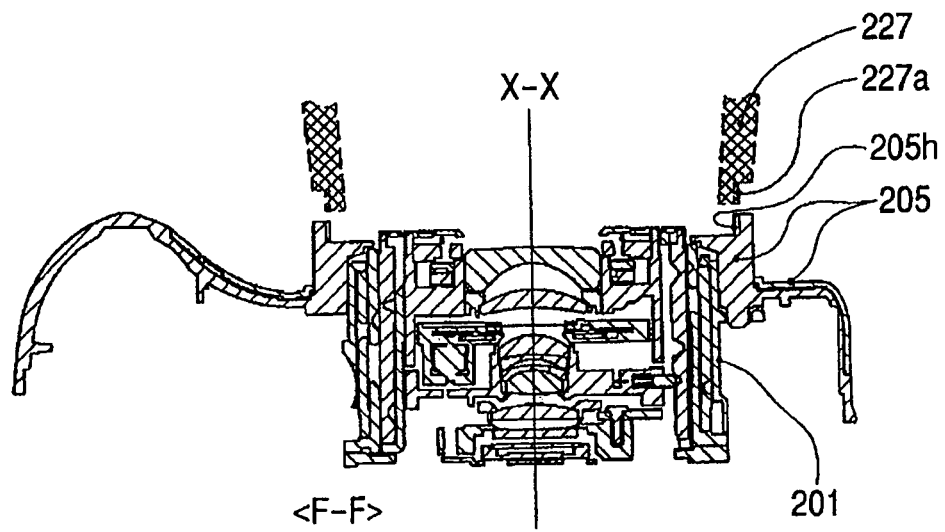

FIG. 18B is an enlarged cross sectional view taken along line F—F in FIG. 18A. Line X—X corresponds to the optical axis center. As shown in FIGS. 18A and 18B, in the structure in which there is no bayonet ring 207 also, it is possible to determine the positioning of the optical axis of the lens barrel unit 201 and the optical axis of the accessory lens 227 only by the front cover 205. This is made possible by providing a screw thread portion 207a near the base of the accessory lens 227 and screw thread portion 205h on the front end of the front cover 205.

Figure 19:
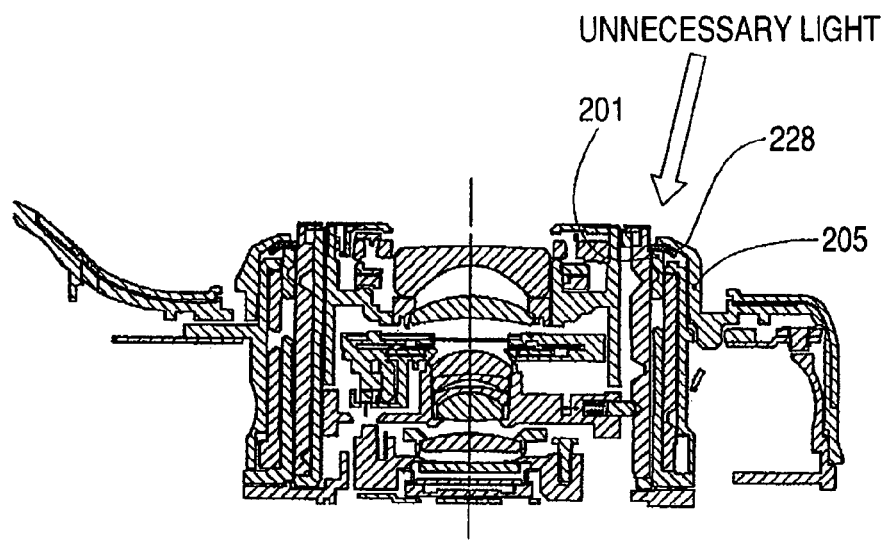
FIG. 19 is a cross sectional view showing a modification of the first embodiment having an elastic member that additionally functions to block light.

As shown in FIG. 19, an annular (though not limited to annular) elastic body 228 is provided between the lens barrel unit 201 and the front cover 205. This can achieve the effect same as the elastic bodies 218a and 218b. In addition, if the elastic body 228 is made of a light blocking material, it is possible to block unnecessary light that might enter through a small gap of the lens barrel unit 201. The elastic body having a light blocking function may be, for example, a dark-colored rubber, a dark-colored foam material or a dark-colored elastomer resin.

Figure 20:
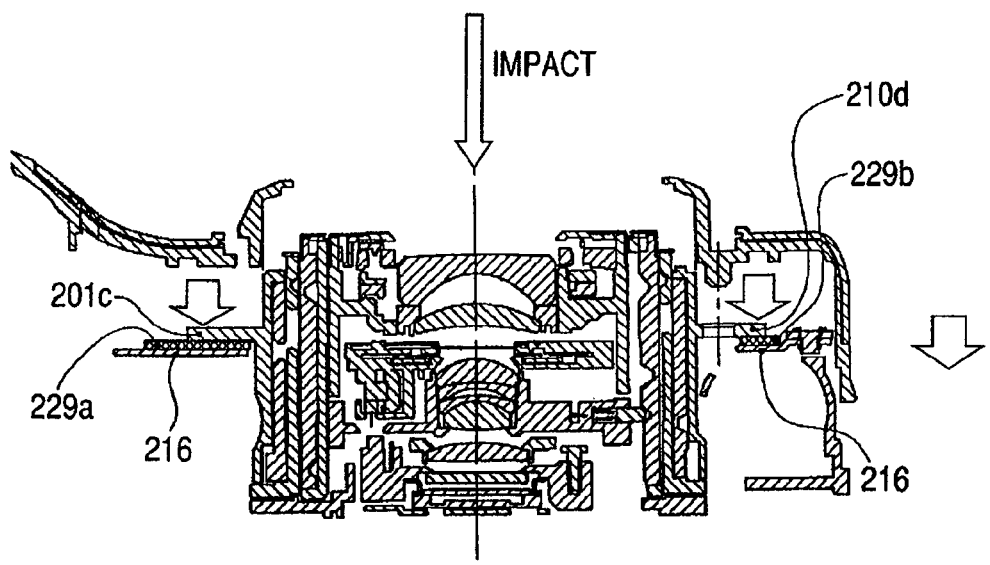
FIG. 20 is a cross sectional view showing a modification of the first embodiment having an elastic member that additionally functions to release impact.

As shown in FIG. 20, elastic bodies 229a and 229b are provided between the chassis 216 and the flange portions 201c and 201d of the lens barrel unit 201. This can achieve the effect same as the elastic bodies 218a and 218b. In addition, when the image pick up apparatus body is inadvertently dropped, impact on the lens barrel unit 201 will be advantageously relieved.

In the case where a viewfinder unit or a flash unit is annexed to the lens barrel unit 201, the relationship of the anti-rotation engagement portion 205c and the long hole

201*b* shown in FIG. 4 may be replaced by abutment of a portion of the finder unit or the flash unit with a portion of the front cover 205 in the vicinity of these units. In this way, similar prohibition of rotation of the lens barrel unit 201 relative to the front cover 205 is achieved.

(Second Embodiment)

In the first embodiment, the front end circumference portion 201*a* of the lens barrel unit 201 shown in FIG. 4 is used as a positioning engagement portion with the front cover 205. The structure for regulation of the lens barrel unit and the front cover with respect to directions perpendicular to the optical axis is not limited to this.

As the second embodiment, another means, different from that in the first embodiment, for regulating the lens barrel unit and the front cover with respect to directions perpendicular to the optical axis will be described.

Figure 21A:
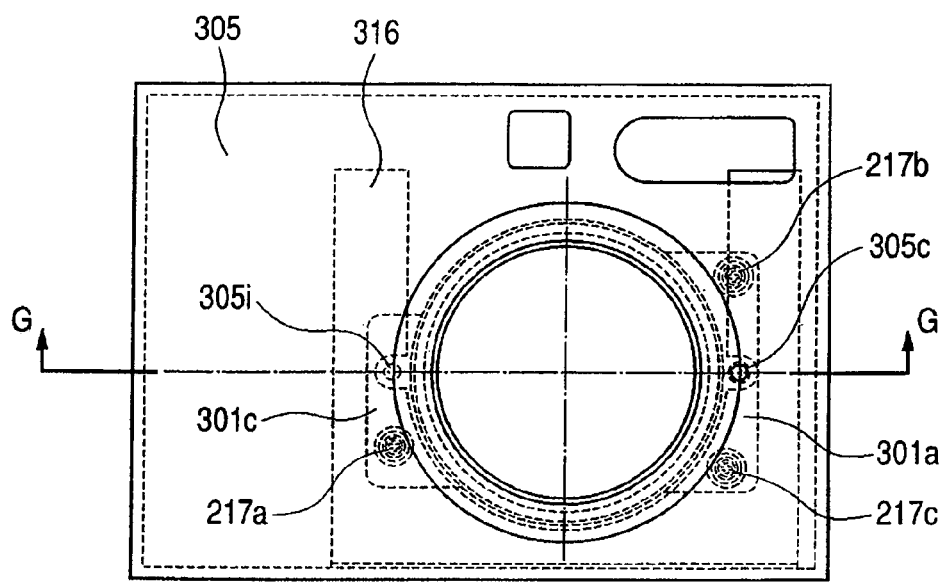
FIGS. 21A and 21B show a second embodiment of the present invention.
Figure 21B:
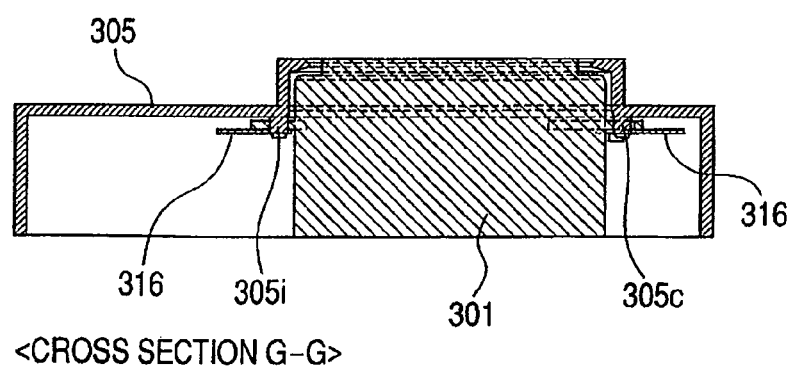

FIGS. 21A and 21B are front view and a cross sectional view taken along line G—G showing only a lens barrel unit 301, a front cover 305 and a chassis 316. The lens barrel unit 301 is supported on the chassis 316 in a floating manner. On the inner side of the front cover 305, two shafts projecting therefrom are provided, that is a positioning engagement shaft 305*i* and an anti-rotation engagement shaft 305*c*. On flange portions 301*c* and 301*d* of the lens barrel unit 301, holes into which the positioning engagement shaft 305*i* and the anti-rotation engagement shaft 305*c* are fitted are formed. The positioning engagement shaft 305*i* is one for positioning of the lens barrel unit 301 with respect to a direction perpendicular to the optical axis. The anti-rotation engagement shaft 305*c* is an engagement shaft for prohibiting rotation of the lens barrel unit 301 in a plane perpendicular to the optical axis.

The same effects can also be realized by providing a shaft(s) projecting from the lens barrel unit 301 and forming on the front cover 305 a hole(s) or recess(s) that engages with the shaft(s).

As per the above, it is possible to regulate the lens barrel unit 301 and the front cover 305 with respect to directions perpendicular to the optical axis at any position on these parts.

(Third Embodiment)

In the first embodiment, the lens barrel unit 201 is supported in a floating manner by shoulder screws 217*a* to 217*c*. Another way of supporting the lens barrel unit on a chassis in a floating manner will be described in the following.

Figure 22A:
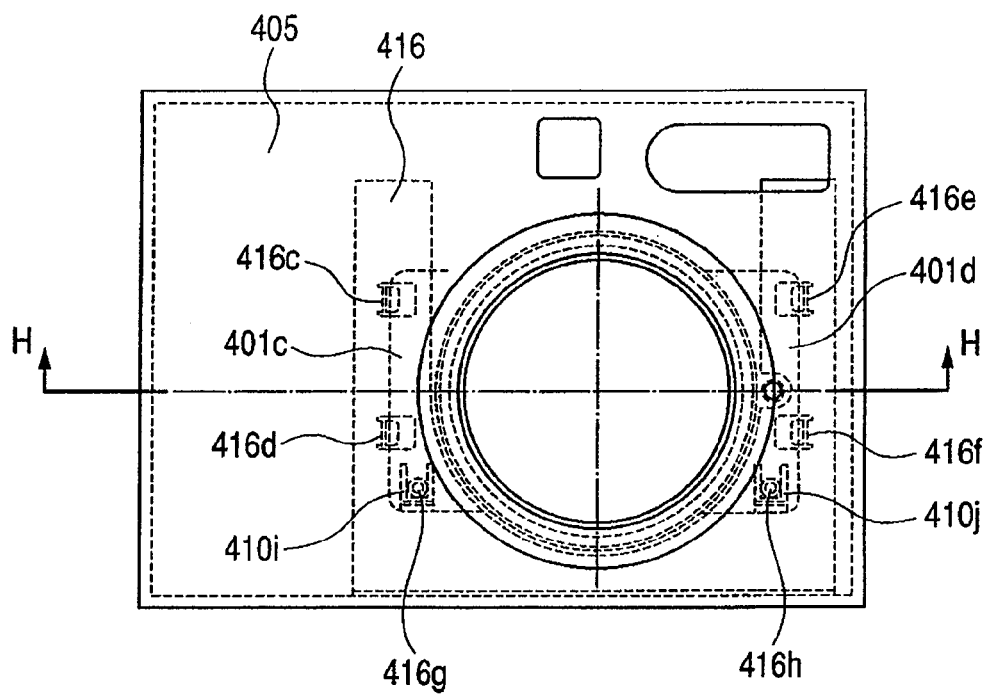
FIGS. 22A and 22B show a third embodiment of the present invention.
Figure 22B:
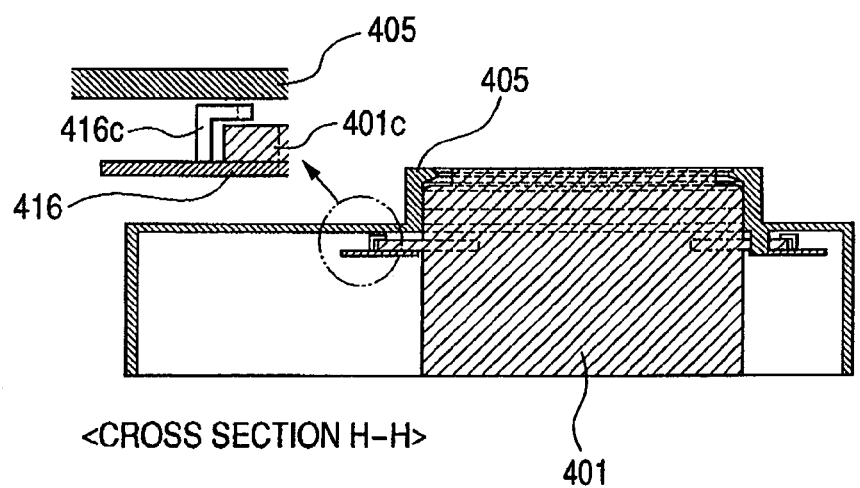

FIGS. 22A and 22B are front view and a cross sectional view taken along line H—H showing only a lens barrel unit 401, a front cover 405 and a chassis 416.

Figure 23:
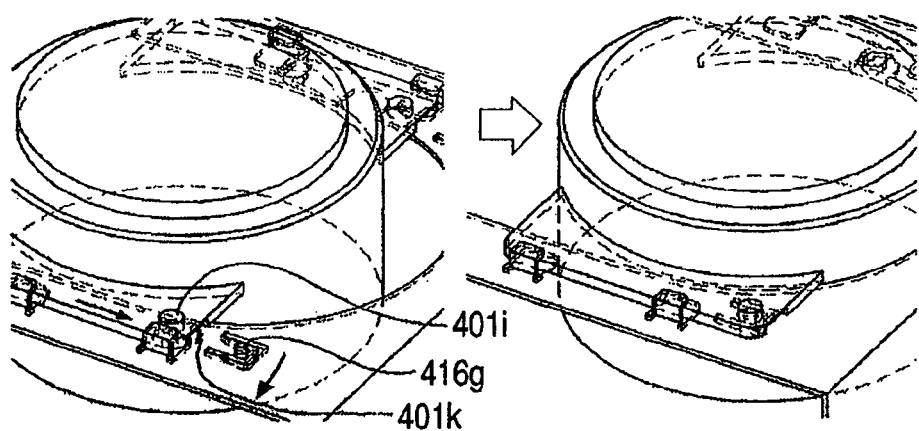
FIG. 23 is a perspective view showing a process of setting a lens barrel unit on a chassis in a floating manner in the third embodiment.

In FIGS. 22A and 22B, hook portions 416*c*, 416*d*, 416*e* and 416*f* having substantially the same shape are formed by cutting and bending up portions of the chassis 416. Flange portions 401*c* and 401*d* of the lens barrel unit 401 are slid as shown in FIG. 23 to engage the chassis 416. In this process, a latch shaft 416*g* is flexed by a guide portion 401*k* in the direction indicated by an arrow and gets into a latch hole 401*i* so as to be latched therein. The latch hole 401*i* has a diameter sufficiently larger than the diameter of the latch shaft 416*g*, and therefore the lens barrel unit 401 is movable relative to the chassis 416 with respect to directions perpendicular to the optical axis. A latch shaft 401*j* and a latch hole 416*h* are also in a similar relationship. As shown in the enlarged H—H cross sectional view in FIG. 22B, the flange portion 401*c* of the lens barrel unit 401 has a sufficient clearance with respect to the hook portion 416*c* (such clearance is also present for each of the other hook portions 416*d*, 416*e* and 416*f*), and therefore the lens barrel unit 401 is supported in such a way as to be movable relative to the chassis 416 in the optical axis direction.

As per the above, floating support can also be realized without using shoulder screws.

Although in this third embodiment, the lens barrel unit is slid downwardly, the sliding direction may be changed to other directions. Alternatively, the lens barrel unit 401 may be mounted on the chassis 416 by turning it about the center axis on the optical axis.

(Fourth Embodiment)

In the first embodiment, two elastic bodies 218*a* and 218*b* are used to regulate the lens barrel unit 201 relative to the front cover 205 with respect to the optical axis direction while biasing it. In the following, a structure in which a lens barrel unit is regulated relative to a front cover with respect to the optical axis direction without using an elastic body will be described.

Figure 24A:
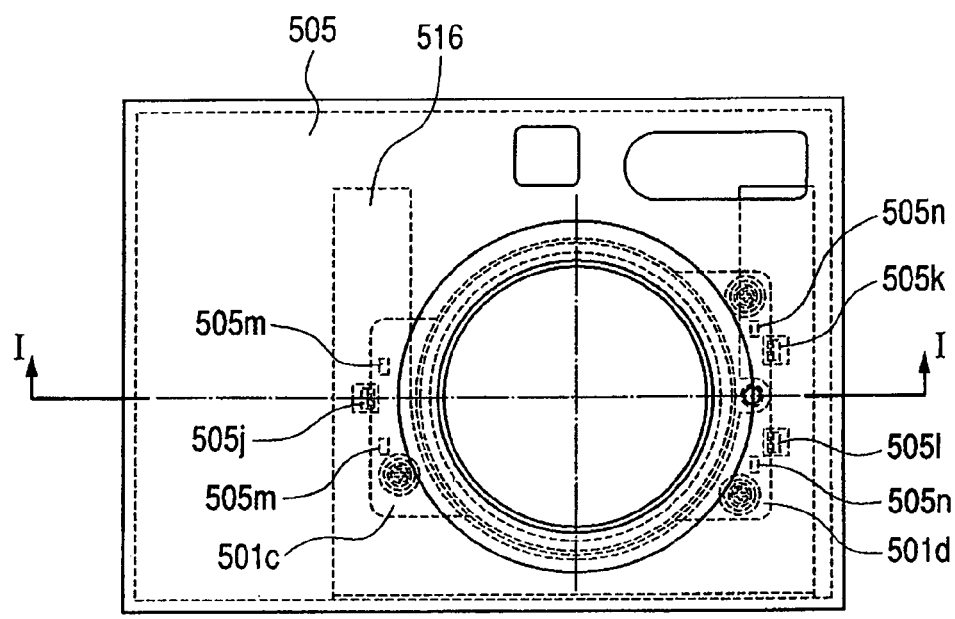
FIGS. 24A and 24B show a fourth embodiment.
Figure 24B:
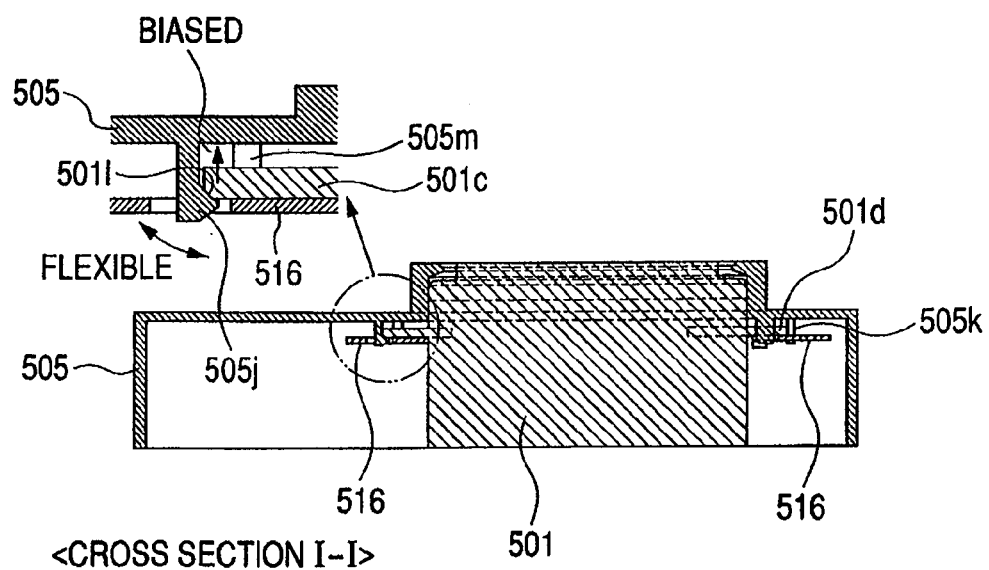
Figure 25:
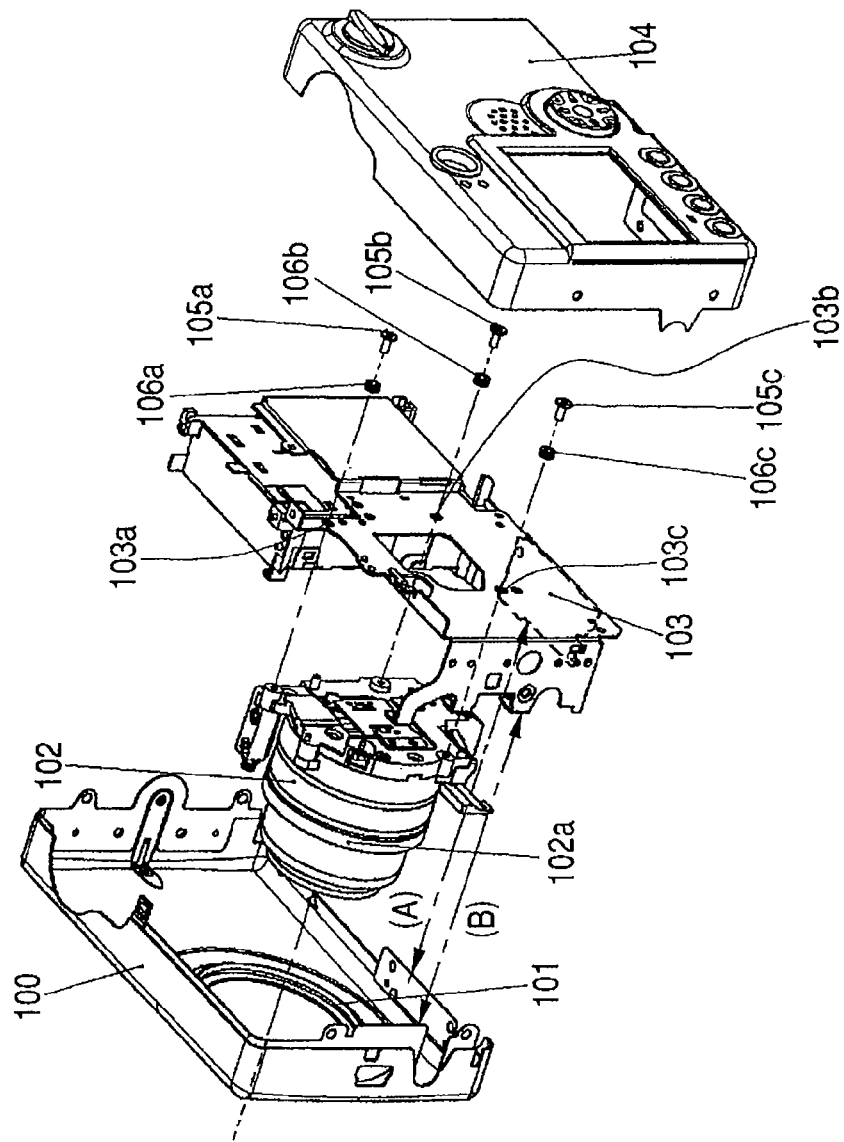
FIG. 25 is an exploded perspective view of a conventional image pick up apparatus having a floating support structure for a lens barrel.
Figure 26:
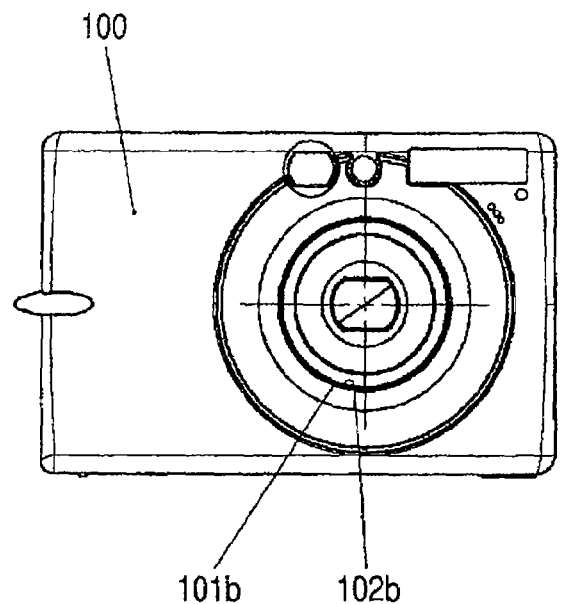
FIG. 26 is a front view of the conventional image pick up apparatus shown in FIG. 25.
Figure 27:
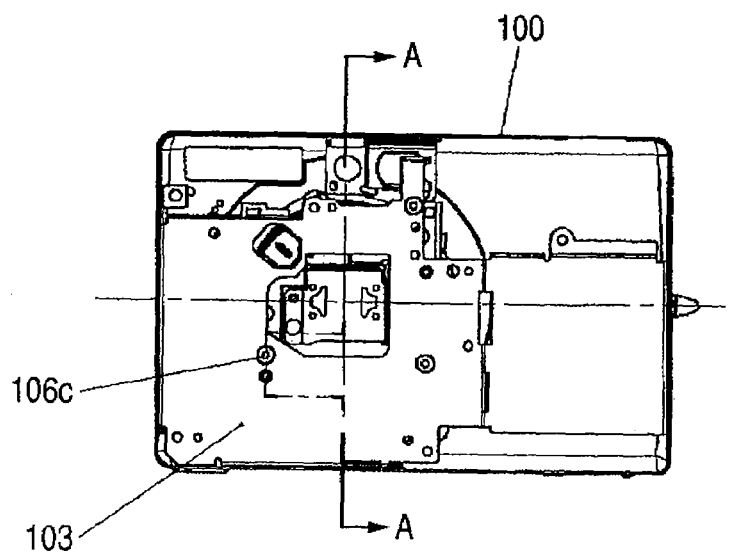
FIG. 27 is a rear view of the conventional image pick up apparatus shown in FIG. 25 in a state in which a rear cover has been detached.
Figure 28:
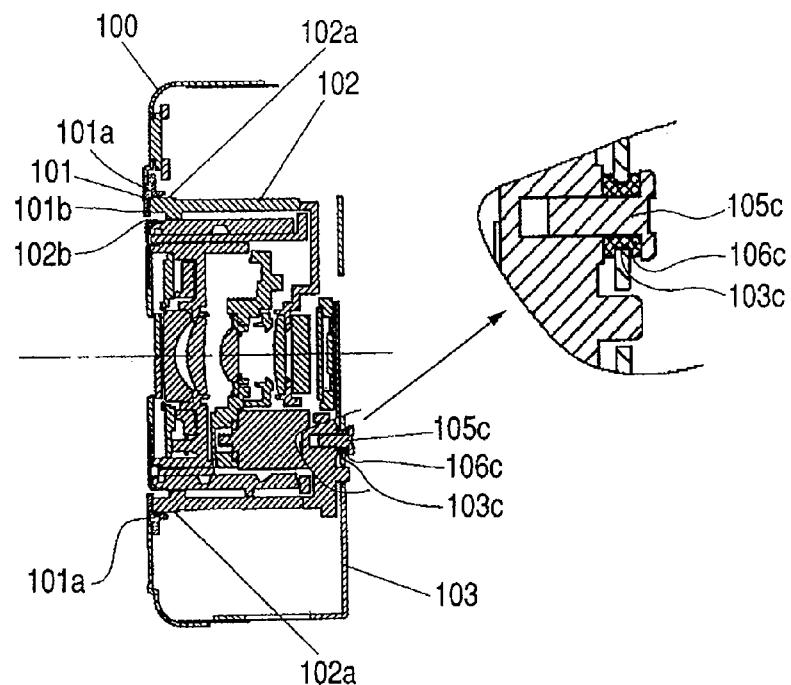
FIG. 28 is a cross sectional view of the conventional image pick up apparatus shown in FIG. 25.
Figure 29:
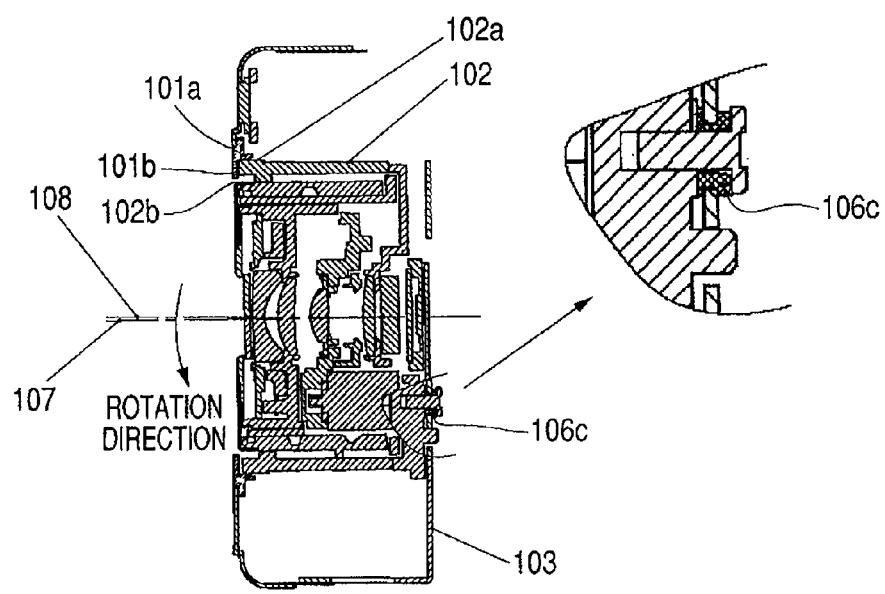
FIG. 29 is a cross sectional view of the conventional image pick up apparatus shown in FIG. 25 in a state in which the lens barrel unit is slanted.

FIGS. 24A and 24B are front view and a cross sectional view taken along line I—I showing only a lens barrel unit 501, a front cover 505 and a chassis 516.

In FIGS. 24A and 24B, the lens barrel unit 501 is supported on the chassis 516 in a floating manner.

On the inner side of the front cover 505, hook portions 505*j*, 505*k* and 505*l* are provided. Similarly, ribs 505*m* and 505*n* to be in contact with flange portions 501*c* and 501*d* of the lens barrel unit 501 are also provided. When the front cover 505 is assembled, regulation of the lens barrel unit 501 with respect to directions perpendicular to the optical axis is achieved by the front cover 505, as is the case with the first embodiment. In addition, the hook portion 505*j* flexes in the direction indicated by an arrow to engage and latch the flange portion 501*c* of the lens barrel unit 501. The rib 505*m* functions as a stopper. An edge of the flange portion 501*c* is formed as a bevel 501*l*, and the flange portion 501*c* is biased by elastic force of the hook portion 505*j* in the direction indicated by an arrow (i.e. the upward direction in FIG. 24B). The other hook portions 505*k*, 505*l* have the shape same as the hook portion 505*j*, and they also exert biasing forces in a similar manner. The hook portions 505*j*, 505*k* and 505*l* are integrally projecting from the front cover made of a plastic resin. The same effects will be achieved also in the case where the hook portions are constituted by separate members attached to the front cover 505.

The position of the hook portions are not limited to those described above. The same effects will be achieved also in the case where the hook portions are formed to project from the lens barrel unit and the latch portions are provided on the front cover.

This application claims priority from Japanese Patent Application No. 2005-011081 filed Jan. 19, 2004, which is hereby incorporated by reference herein.

What is claimed is:

1. An image pick up apparatus comprising:
    a lens barrel unit including a photographing optical system;
    a holding unit that holds the lens barrel unit in such a way that the lens barrel unit is movable in a direction of an optical axis of the photographing optical system and a direction perpendicular to the optical axis; and
    a front cover that covers the front side of the image pick up apparatus;
    wherein the position of said lens barrel unit relative to said front cover with respect to the direction perpendicular to the optical axis and with respect to the optical axis direction is determined by said front cover.

2. An image pick up apparatus according to claim 1, wherein optical axis perpendicular direction positioning means for positioning said lens barrel unit relative to said front cover with respect to the direction perpendicular to the optical axis comprises a part of said lens barrel unit and a part of said front cover that engage each other.

3. An image pick up apparatus according to claim 1, wherein optical axis direction positioning means for positioning said lens barrel unit relative to said front cover with respect to the optical axis direction comprises an elastic body provided between said lens barrel unit and said front cover.

4. An image pick up apparatus according to claim 3, wherein said elastic body is adapted to block light entering through a clearance between said lens barrel unit and said front cover.

5. An image pick up apparatus according to claim 1, wherein optical axis direction positioning means for positioning said lens barrel unit relative to said front cover with respect to the optical axis direction comprises an elastic body provided between said lens barrel unit and said front cover.

6. An image pick up apparatus according to claim 1, wherein optical axis direction positioning means for positioning said lens barrel unit relative to said front cover with respect to the optical axis direction comprises a hook portion that is provided on said front cover so as to latch said lens barrel unit.

7. An image pick up apparatus comprising:
a lens barrel unit including a photographing optical system;
a holding unit that holds the lens barrel unit in such a way that the lens barrel unit is movable in a direction of an optical axis of said photographing optical system and a direction perpendicular to the optical axis; and
a front cover that covers the front side of the image pick up apparatus;
wherein a part of the lens barrel unit and a part of the front cover engage each other.

8. An image pick up apparatus comprising:
a lens barrel unit including a photographing optical system;
a holding unit that holds the lens barrel unit in such a way that the lens barrel unit is movable in a direction of an optical axis of the photographing optical system and a direction perpendicular to the optical axis;
a front cover that covers the front side of the image pick up apparatus; and
an elastic body provided between the lens barrel unit and the front cover.

9. An image pick up apparatus comprising:
a lens barrel unit including a photographing optical system;
a holding unit that holds the lens barrel unit in such a way that the lens barrel unit is movable in a direction of an optical axis of said photographing optical system and a direction perpendicular to the optical axis;
a front cover that covers the front side of the image pick up apparatus; and
an elastic body provided between the holding unit and the lens barrel unit.

10. An image pick up apparatus according to any one of claims 1 to 9, wherein an accessory lens is mountable on said front cover.

11. An image pick up apparatus according to any one of claims 3 to 9, wherein said optical axis direction positioning means is provided around said lens barrel unit.

* * * * *

UNITED STATES PATENT AND TRADEMARK OFFICE
CERTIFICATE OF CORRECTION

PATENT NO. : 7,190,534 B2
APPLICATION NO. : 11/331318
DATED : March 13, 2007
INVENTOR(S) : Tomoki Takahashi It is certified that error appears in the above-identified patent and that said Letters Patent is hereby corrected as shown below:

Column 13, lines 21-22, delete " said lens barrel unit and said front cover. " and insert -- said holding unit and said lens barrel unit. --

Signed and Sealed this

Thirtieth Day of October, 2007

JON W. DUDAS
*Director of the United States Patent and Trademark Office*